United States Patent [19]

Rubey

[11] 4,177,751

[45] Dec. 11, 1979

[54] METHOD OF FORMING A DEVICE FOR SHOWING RECEIPT OF PREDETERMINED SHOCK

[75] Inventor: Ulyss R. Rubey, Lewisville, Tex.

[73] Assignee: Detectors, Inc., Graham, Tex.

[21] Appl. No.: 913,479

[22] Filed: Jun. 7, 1978

Related U.S. Application Data

[62] Division of Ser. No. 788,008, Apr. 15, 1977, Pat. No. 4,125,085.

[51] Int. Cl.² ............................................. G01P 15/04
[52] U.S. Cl. ..................................... 116/201; 116/203
[58] Field of Search ................... 116/201, 203; 73/492

[56] References Cited

U.S. PATENT DOCUMENTS

| | | | |
|---|---|---|---|
| 2,825,297 | 3/1958 | Harrison | 116/203 |
| 3,357,260 | 12/1967 | Detalle | 73/515 X |

FOREIGN PATENT DOCUMENTS

2515221 10/1975 Fed. Rep. of Germany ............. 73/515

*Primary Examiner*—Charles A. Ruehl
*Attorney, Agent, or Firm*—Wofford, Fails & Zobal

[57] ABSTRACT

A device for affording an indication when a predetermined mechanical shock has been received, characterized by a base, or means for attaching to a container to be monitored; structure for measuring when a predetermined acceleration has been received by the container and the device; and an indicator for indicating to an observer that the shock has been received. Disclosed are devices having (1) a mechanical structure with a breaking point; (2) a mechanical structure with a biasing means; and (3) a structure employing an interfacial tension phenomenon. The devices may be of the "go-no go" type or may afford an indication and history of the shock, or acceleration forces, received. Also disclosed are the specific details of the respective embodiments.

3 Claims, 18 Drawing Figures

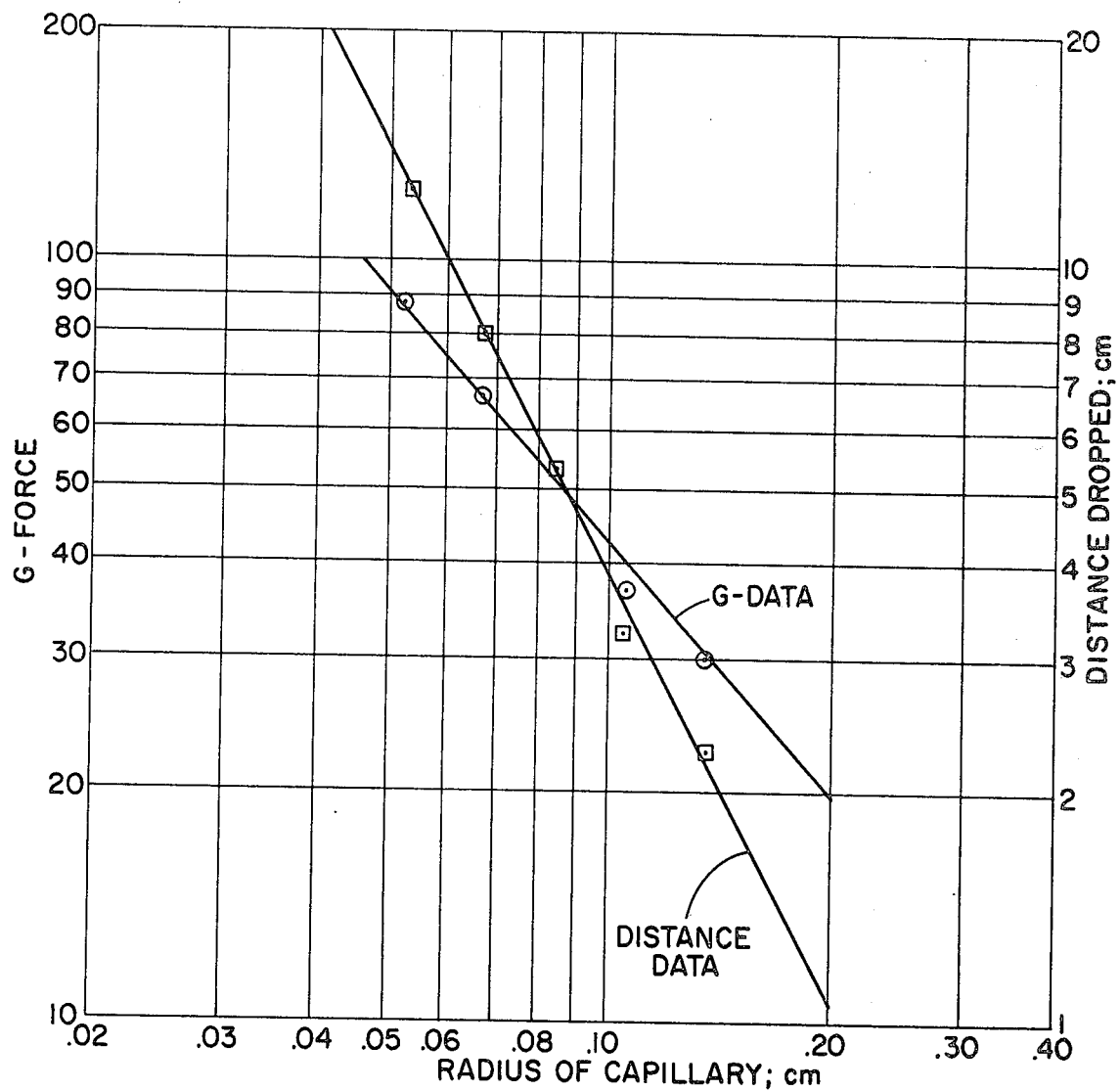
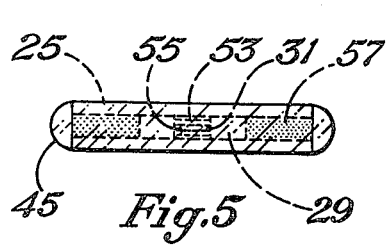
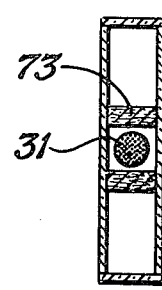
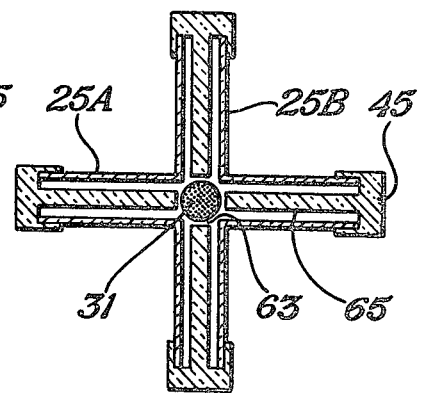
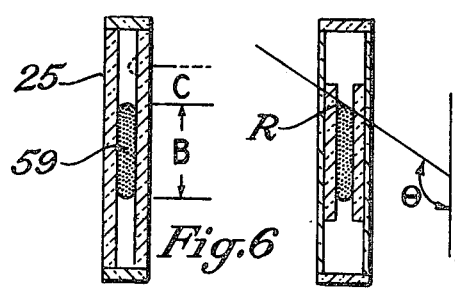

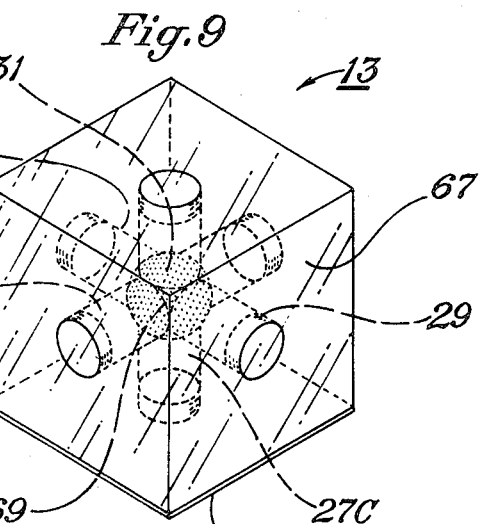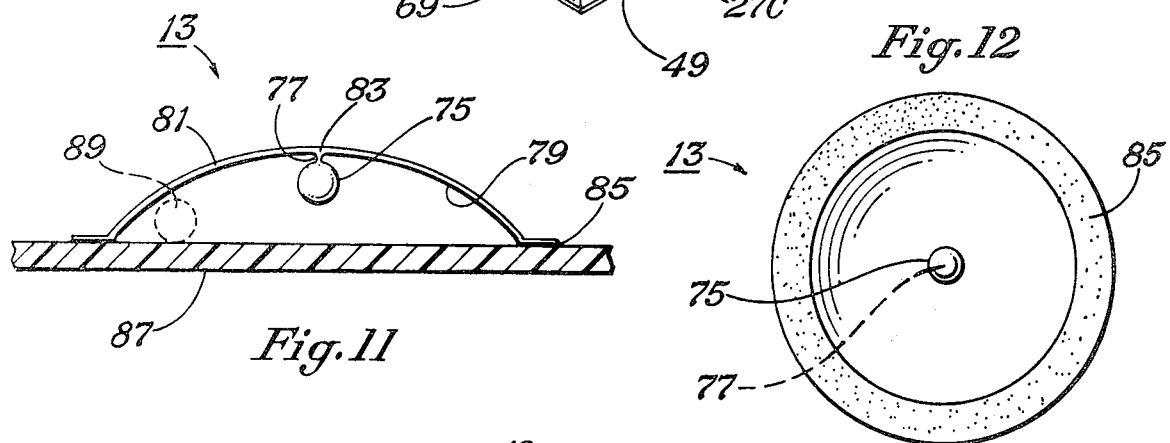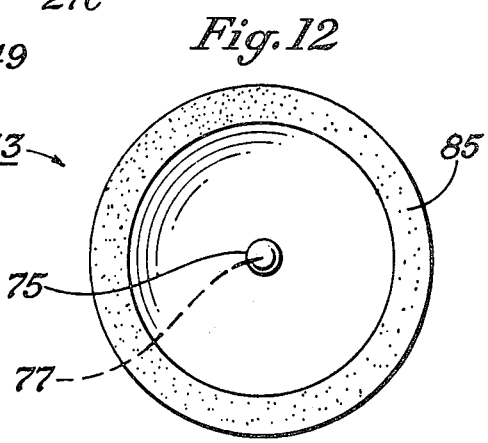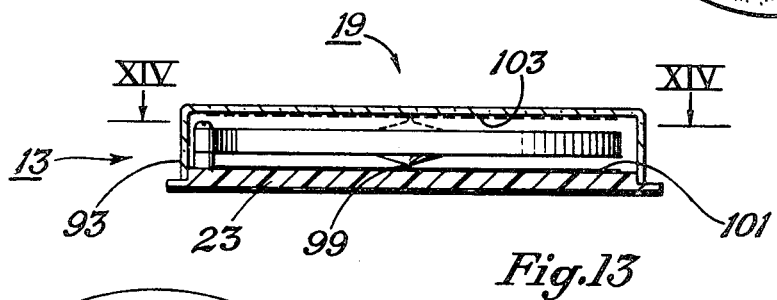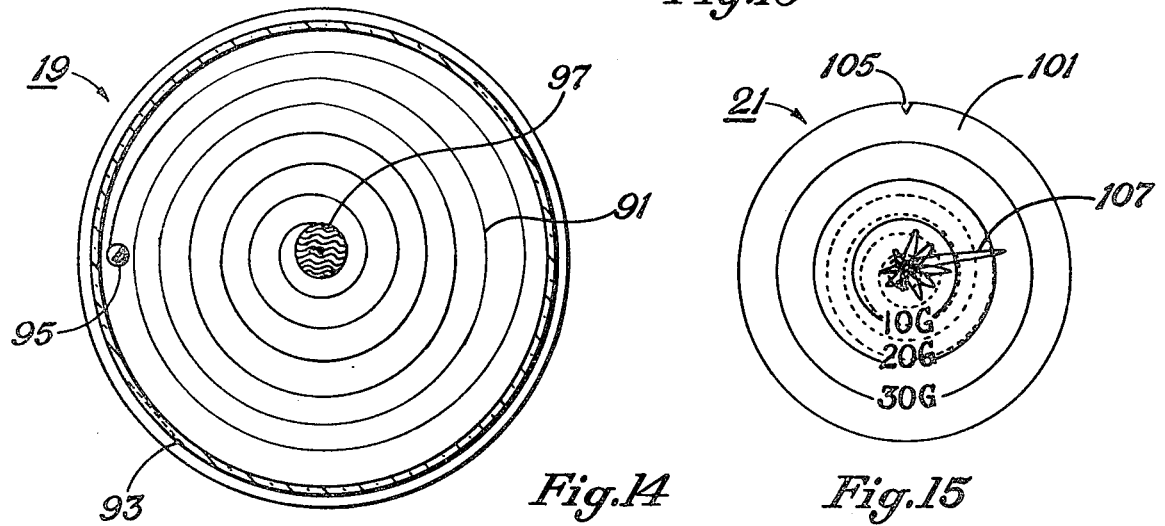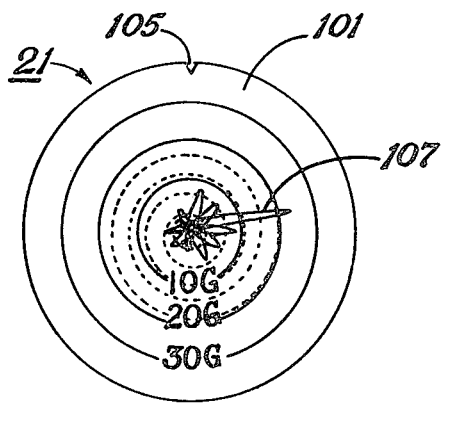

METHOD OF FORMING A DEVICE FOR SHOWING RECEIPT OF PREDETERMINED SHOCK

This is a division, of application Ser. No. 788,008, filed Apr. 15, 1977, U.S. Pat. No. 4,125,085.

BACKGROUND OF THE INVENTION

1. Field of the Invention

This invention relates to apparatus for detecting when equipment or articles of manufacture have been subjected to a mechanical shock, or force, great enough to cause malfunctioning. More particularly, it relates to a device that can be readily attached to a container or the like for monitoring when the container has been subjected to an acceleration, or force, great enough to cause malfunctioning of equipment or elements within the case or container.

2. Description of the Prior Art

The prior art has seen development of a wide variety of complex electronic, mechanical, and electromechanical apparatus that fails to operate properly for many reasons. One of the many reasons that has plagued recently developed apparatus is that the apparatus or component thereof may sustain a mechanical shock of sufficient magnitude to cause malfunctioning, as by altering domain orientation, or breaking, or deforming one one or more of the operating components. Specifically, the prior art has seen development of equipment such as test instruments, disc packs, disc cartridges, and other devices employing magnetic storage for computer programs and the like that fail to operate when subjected to excessive shock.

One measure of the mechanical shock is the number of G's that have been experienced by the component, for example, by the container or the like; where G is the acceleration of the earth's gravity. The number of G's has been variously referred to as shock, acceleration forces, or just acceleration. In effect, it may be a negative acceleration, or deceleration, in that it measures the rapidity with which case is brought to a stop, for example, in striking a door jam or the like.

The prior art has failed to provide an economical system for monitoring whether or not the components have been subjected to the shock, or acceleration. Instead, where the expense was economically feasible, elaborate systems have been employed to monitor the acceleration, or acceleration forces, and provide an indication of the acceleration to which the component had been subjected. Such devices of the prior art have, however, been elaborate and expensive and not economical enough to be employable on less expensive discs, cartridges, and small test equipment.

SUMMARY OF THE INVENTION

Accordingly, it is an object of this invention to provide a simple economical device that can be readily affixed to a container or the like so as to provide at least an indication when a predetermined mechanical shock, or acceleration, has been inflicted on the particular container or component.

It is also an object of this invention to provide one or more devices that allow the use of a simple "go-no go" device for indicating that the predetermined shock has been received, or allow the use of a more pervasive device that will afford a history of the shocks received.

These and other objects will become apparent from the following descriptive matter, particularly when taken in conjunction with the drawings.

In accordance with this invention, there is provided a device for affording an indication when a predetermined mechanical shock, or deceleration, has been effected. The device includes an attachment means for attaching it to a container for monitoring if the predetermined acceleration has been exceeded; a measuring means for measuring the accelerations to which the container or the like is subjected; and an indicator means for indicating when the predetermined acceleration has been effected as measured by the measuring means. The attachment means, measuring means and indicator means are connected together in a compact unit that can be readily fixedly attached to the container to be monitored.

In one embodiment, the invention comprises a device employing physical chemistry type interfacial tension forces to afford a "go-no go" indication. Expressed otherwise, the device comprises a hollow tube having a bore and employing two different substances having an interfacial barrier therebetween such that the interfacial barrier is broken when a predetermined acceleration is received. Expressed otherwise, the device employs the interfacial barrier that is ruptured to advise if the predetermined acceleration has been experienced.

In another embodiment of this invention, the device employs a weight or the like that is centered by suitable biasing means but which affords an indication when a predetermined acceleration has been given. The indication may be in the form of a permanent record of the accelerations that have been received and the directions from which the accelerations were received.

In still another embodiment, the device comprises a weight that is connected by a device that is broken when predetermined acceleration is experienced to provide a "go-no go" indication.

BRIEF DESCRIPTION OF THE DRAWINGS

FIG. 3B is a graph correlating the responses of devices like FIG. 3A, of various diameter bores with the acceleration effecting rupture of a given interfacial barrier.

FIG. 5 is a side elevational view of a tube of another embodiment of this invention.

FIG. 6 is a cross sectional view of a simplified, theoretical embodiment of this invention.

FIG. 7 is a cross sectional view of another simplified, theoretical embodiment of this invention employing intermediate capillarity.

FIG. 8 is a cross sectional view of an embodiment of this invention in which the bores are disposed about an intersection at mutually perpendicular axes in a single plane.

FIG. 9 is an isometric view of a multiplanar embodiment of this invention in which the bores are disposed about three axes that are mutually perpendicular to each other and intersect at an intersection.

FIG. 10 is a cross sectional view of still another embodiment of this invention.

FIG. 11 is a cross sectional view of a mechanical device affording "go-no go" indication capability.

FIG. 12 is a bottom plane view of the embodiment of FIG. 11.

FIG. 13 is a side elevational view, partly in section, of the mechanical device of this invention that employs a record of the shocks to which it has been subjected.

FIG. 14 is a top plane view of the embodiment of FIG. 13.

FIG. 15 is a top plane view of the record of the embodiment of FIG. 13.

DESCRIPTION OF PREFERRED EMBODIMENTS

Figure 1:
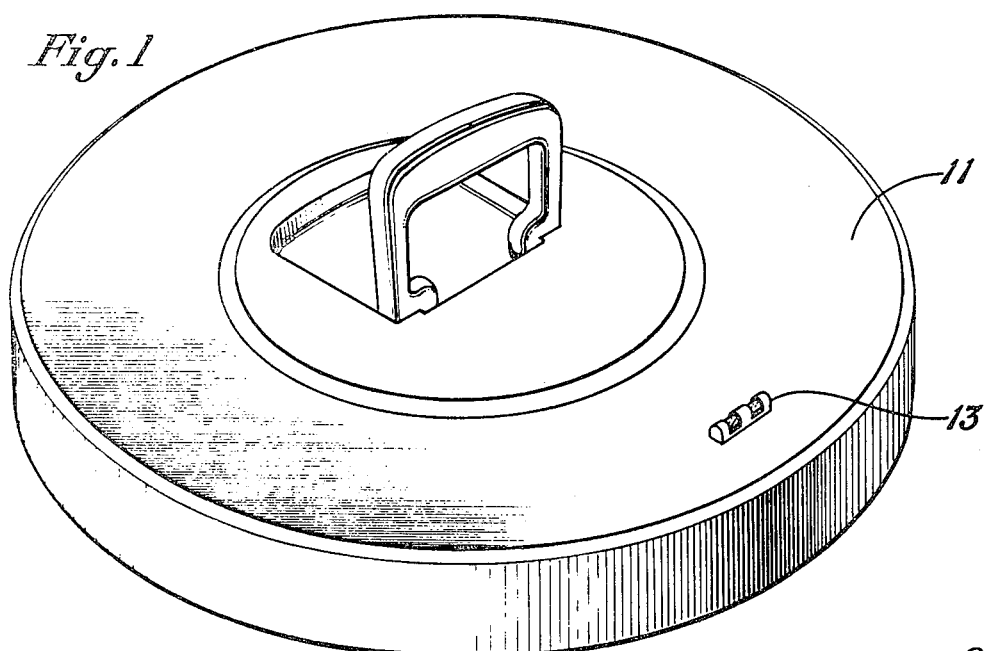
FIG. 1 is an isometric view of one embodiment of this invention employed on a magnetic disc cartridge.

As implied hereinbefore, the shock detection device of this invention may be employed on any instrument, case, container, or the like, in order to monitor the shock that has been received by the container and its contents. One area that is particularly critical in view of the potential high liability of the computer manufacturer and suppliers of hardware and the like is in the area of magnetic disc cartridges and magnetic disc packs. Accordingly, in FIG. 1, there is illustrated a disc cartridge 11 containing a disc therewithin and having the shock detection device 13, in accordance with this invention, rigidly attached to the case. The shock detection device may be simply affixed to the exterior of the cartridge case, as by bonding with an adhesive, or recessed within custom-made housings or the like. In any event, the shock detection device 13 will afford a visual indication when the predetermined shock, or acceleration, necessary to disrupt its interfacial barrier, or boundary, has been affected as described in more detail hereinafter. Thus, the user of the cartridge will have an indication if the shock greater than that requiring checking the disc has been experienced. If it has been experienced, the user can have a service representative check the disc to verify that it is correct or that it has been damaged, as the case may be. As is recognized, these disc packs are manufactured to the highest possible standards, using precision equipment, and normally will give years of trouble free, reliable service in peripheral storage if they are not subjected to excessive shock or the like. Because of the large potential liabilities, the shock detection device 13 assumes a significance far beyond its economical cost.

Figure 2:
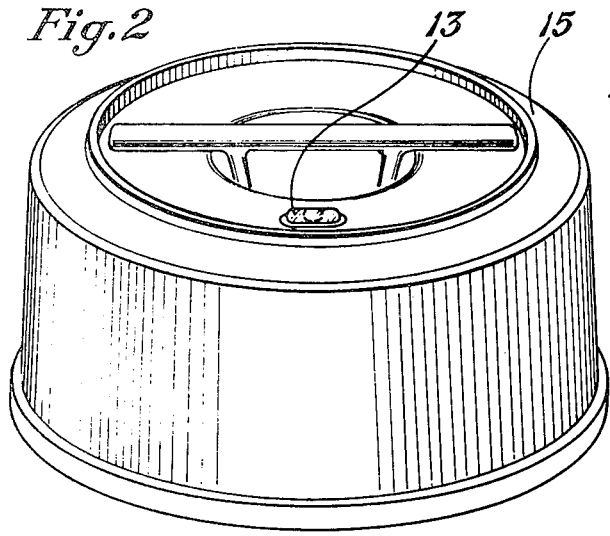
FIG. 2 is an isometric view of another embodiment of this invention employed on a magnetic disc pack.

Referring to FIG. 2, there is illustrated a disc pack having a shock detection device 13 rigidly affixed thereto. Although the shock detection device 13 may vary somewhat in structure from that of FIG. 1, its import is the same and it affords a "go-no go" indication for the user of the discs and the disc pack. The shock detection device 13, FIG. 2, may be recessed so as to be out of the way and allow stacking the disc packs or the like.

Figure 3A:
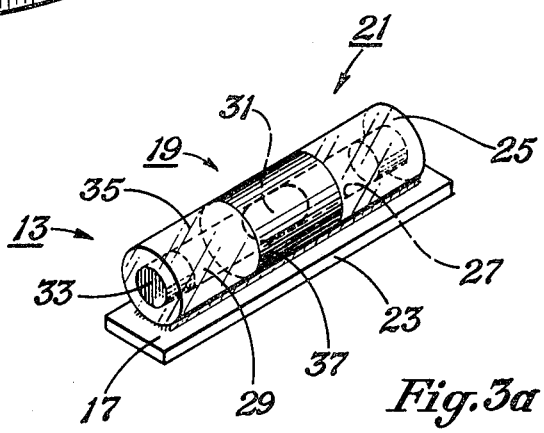
FIG. 3A is an isometric view of a simple embodiment of this invention.

As indicated, the shock detection devices 13 may take any of several forms. One of the simpliest forms is illustrated in FIG. 3A. Therein, the shock detection device 13 includes an attachment means 17 for attaching it to a container or the like; a measuring means 19 for measuring if a predetermined shock, or acceleration, has been received; and an indicator means 21 for indicating if the predetermined acceleration has been received.

As illustrated, the attachment means 17 comprises a mounting base 23 that may or may not have an adhesive preapplied and covered with suitable peel-off backing or the like. If the mounting base 23 does not have such preapplied adhesive, it may be applied to the container, instrument, or the like by any of the conventional means. Such conventional means include the adhesives or bonding such as epoxy resin, glue, or other bonding materials for rigidly affixing it to the case. If desired, of course, mechanical means such as screws, bolts, and the like; may be employed for affixing the mounting base to the container or instrument to be monitored. The mounting base may be formed of plastic, metal, or any other economical material. For most modern applications, use of plastic for the mounting base has been found to be advantageous. The plastic may comprise either the thermosetting plastics, such as the phenol-formaldehyde plastics, or the thermoplastic materials, such as the polyethylene, polypropylene, acrylonitrile butadiene styrene copolymer (ABS), Nylon, Delrin, Orlon, and the like. The mounting base should be formed of material that can be readily bonded, or connected with the measuring means 19.

The measuring means 19 includes a hollow tube 25 having a bore 27 traversing longitudinally thereof, at least two materials 29 and 31 disposed in the bore, and sealing means 33 sealing the ends of the bore.

As illustrated, the measuring means 19 is so intimately connected with the indicator means as to form a unitary structure. Specifically, the indicator means 21 comprises a transparent section 35 in at least one end of the hollow tube 25; and, preferably, at both ends; such that a visual indication is afforded if the shock has been experienced, as will become apparent from the descriptive matter hereinafter.

Preferably, the hollow tube 25 is transparent tubing of relatively small internal diameter such that the bore 27 may readily hold a droplet of liquid or the like. If the entire tubing is transparent, an opaque band 37 may be employed to conceal the material 31 until the interfacial boundary or barrier has been ruptured by the predetermined shock, as will be described in more detail hereinafter.

In the illustrated embodiment, the two materials 29 and 31 are, respectively, a gas and a liquid and are chosen such that the droplet of the liquid forming the material 31 is held near the center of the tube by discrete slugs of gas comprising ends of the tube filled with the gas 29. As illustrated, there are three discrete slugs of the materials 29 and 31 with the liquid droplet 39 extending across and completely blocking the bore 27 near the mid-point thereof with discrete slugs of the gas, such as air, 29 at each end of the bore. The interfacial barriers between the liquid and gas will rupture if a predetermined shock is received. The respective plugs 33 sealingly engage the walls of the tubing such that the air and liquid are trapped therewithin.

As will be discussed in more detail hereinafter, the materials 29 and 31 may comprise widely different types of materials. Moreover, as in the illustrated embodiment where the material 29 is a gas and the material 31 is a liquid, a variety of materials can be employed. In the illustrated embodiment, an aqueous solution of an antifreeze, such as ethylene glycol, and a water soluble dye, such as red dye, form a red droplet 31 held in place by slugs of air, forming air caps 29, at each end of the bore.

The transparent tubing 25 is formed of a material that is hydrophobic such that the aqueous liquid droplet 31 does not wet the surfaces of the tubing. On the other hand, the transparent tubing 25 may be formed of glass and rendered non-wetting by suitable well-known techniques. For example, the interior surfaces may be rendered hydrophobic, as by spraying with a hydrocarbonaceous material, a silicone, such as Siliclad. The droplet of liquid 31 may comprise, for example, 60–70% by weight of water, 26–36% by weight of an aqueous antifreeze such as ethylene glycol, diethylene glycol, or triethylene glycol, and 1–6% of a suitable dye, such as the aforementioned red dye that is water soluble.

In operation, the shock detection device 13 is assembled as described hereinbefore. The liquid is held together by surface tension, or "skin effect", and held in position blocking the bore 27 by the slugs of air, or air plugs, in each end of the tube 25. The liquid is of a contrasting color, such as red. It is not normally visible because of the opaque band 37. The device is attached to the container that it is desired to monitor. If the container or device receives a shock of sufficient magnitude (sufficient acceleration or acceleration force) to break the liquid surface tension that defines the interfacial barrier between the respective liquid droplet and the air slugs 29, the liquid will flow into one or both ends of the tube and be visible. If visible, the propective user is warned that the predetermined shock has been experienced and may wish to check the instrument, the magnetic disc, or the material being monitored.

FIG. 3B is an empirical correlation for the above described device showing the radius of the capillary in centimeters, onto a hard surface and the G forces that are encountered. This empirical correlation can be expressed by Equation I.

$$G = (3.28/r^{1.11}) \quad (I)$$

where:
G is the acceleration of gravity in dimensionless units and,
r is the radius of the capillary in centimeters.

While the correlation is accurate for the given device, there are several factors that affect the force which will effect a rupture of the interfacial boundary, or barrier, between the materials. For example, the forces that are necessary to effect a rupture are affected by the following:
1. diameter of the tube 25;
2. the interfacial tension between the fluids (for example, the surface tension of the aqueous droplet with respect to the air);
3. density of the liquid and the length of the column, or droplet, of the liquid; and
4. the tube material, which affects the contact angle of the approach to wetting of the inner walls of the bore by the liquid.

Figure 4A:
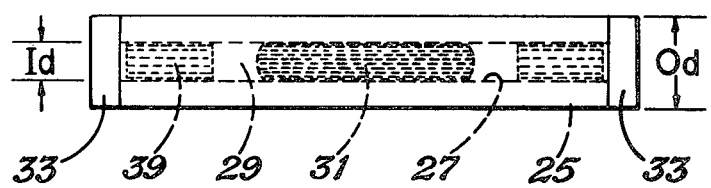
FIG. 4A is a side elevational view, partly in section, of a preferred embodiment of a tube of this invention.

It has been found that when a predetermined shock is experienced, some of the air trapped in the ends of the tube tends to prevent movement of the entire droplet, probably because of compression of the air. The result is that partial rupture of the interfacial barrier between the liquid and the air occurs, and a small droplet tends to separate from the main body of the liquid. In order to make this small droplet more clearly visible, it is preferable to construct the measuring means and the indicator means as illustrated in FIG. 4A. Specifically, the transparent tube 25 has the air 29 and liquid 31 sealingly enclosed therein by ends 33. The inner walls of the bore 27 are rendered non-wetting to the liquid. For example, if liquid comprises an aqueous solution of dye and ethylene glycol, the inner surface of the tube will be non-wetting with respect to that drop. If the tube is formed of glass or the like, the interior surface of the bore 27 may be sprayed with silicone such as Syliclad, to render it non-wetting to the aqueous liquid. On the other hand, the inner surfaces may be inherently hydrophobic, or inherently non-wetting to aqueous solution, if the tube 25 is formed of transparent polyethylene or the like. As illustrated, the ends 33 are adhered, as by epoxy, glue, or resin, to the glass tube. Before the adhesion is effected, however, a clear tube 39 is inserted in each end of the tube 25. The clear tubes 39 have a slightly snug fit to prevent movement. The tubes 39 may be hydrophillic or hydrophobic, since capillary action by the liquid will completely fill the small annular passageway(s). Thus, even a small droplet being separated from the main body of the liquid will coat the entire surfaces of the clear tube to be more readily visible to the observer. This type of construction obviates the disadvantages of having a small droplet that is difficult to see.

Thus, the embodiment of FIG. 4A solves the problem with having a difficultly visible small droplet separated from the main body of liquid and moved into the slug of air trapped in in the end of the tube 25.

Figure 4B:
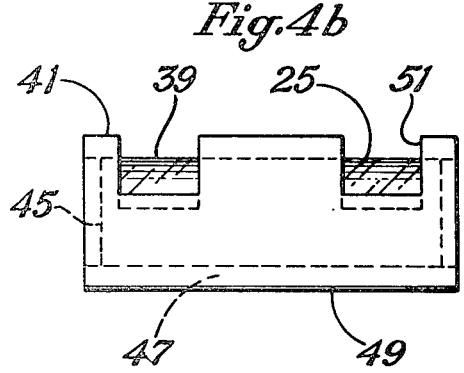
FIG. 4B is a side elevational view of a case; for example, for the tube of FIG. 4A.
Figure 4C:
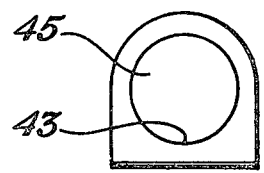
FIG. 4C is an end elevational view of the case of FIG. 4B.

In FIG. 4B and 4C, there is illustrated a case 41 for the detector tube 25; for example, of FIG. 4A. As illustrated, the case 41 is opaque and covers the tube 25 except in the portions where the indicator means 21 or the clear tube 39 are located. In the illustrated embodiment, the tube 39 is inserted within the case 41 into the second bore 43. Thereafter, ends 45 are affixed in place, as by adhesion or the like. The case 41 inherently includes a base 47 to which is applied an adhesive backing 49 that is covered with a peel off section of plastic, such as polyethylene; wax paper; or the like. The case 41 may be formed of any material such as the aforementioned thermosetting plastic, thermoplastic, metal, or other economical materials. As illustrated, the case 41 is formed of a white, rigid plastic, such as those specifically delineated hereinbefore with respect to the base 23. The slots 51 are formed in the case by any suitable means. As illustrated, they are milled thereinto by suitable milling cut made with a single downstroke of the milling wheel for an economical cut. The slight curvature that is effected along the sides of the cut is not objectionable, since it leaves the inner tube 25 clearly visible. The wall thickness of the plastic will be that required to provide the required strength preferably less than 0.050 inch.

While an aqueous liquid in air have been described hereinbefore as the two materials of most commercial interest, it should be readily apparent that a variety of other materials could be employed. For example, suitable porous solids such as fritted glass, porous alumina, silica gel, and the like, whether or not treated to render it non-wetting to the liquid, could be employed in conjunction with a liquid. Depending on the nature of the solid, the liquid may be a hydrophillic liquid, such as an aqueous liquid (if the solid is hydrophobic) or a hydrophobic liquid, such as a hydrocarbonaceous material (if the solid is hydrophillic). Thus, the interfacial barrier would be formed between the porous permeable solid and the liquid. The pores of the solid may be occupied by a gaseous material if desired. The porous solid and the liquid should be selected such that in the event that there is an interfacial barrier rupture, the color of the porous solid, or the exposed material, will be changed to effect a more visible notification that the predetermined shock has been received.

In addition to the aqueous liquids that have been employed hereinbefore, hydrophobic liquids such as hydrocarbonaceous materials like oil, pentane, hexane, heptane, kerosene, naptha, and the like may be employed for the liquid constituent if air or other nonsoluble compressible fluid is employed as the other material, or gas. Mercury can be employed as a liquid material 31. It has a high surface tension of about 485 dynes per centimeter in a pure state so as to be able to sustain much higher G forces. Mercury is readily contaminated, so in practically all cases it will have a surface tension of about 400 dynes per centimeter.

Silica gel may be employed in the ends of the capillary and a solution of phenolphthalein used as the liquid in the center. The solution on coming in contact with the silica jel will turn red.

Moreover, immiscible liquids may be employed if they establish an interfacial barrier there between. The use of liquids is somewhat more difficult, since their relative lack of compressibility prevents adequate distortion of the interfacial barrier to effect the desired reproducibility in rupture at a precise predetermined shock, or acceleration, experienced.

In FIG. 5 there is illustrated another embodiment of the tube 25 that may be employed with a suitable base 23 or within a case 41. The tube 25 is transparent and has a central tube 53 having a capillary 55 defined therewithin for holding the liquid material 31. As noted hereinbefore, the walls in contact with the liquid are preferably non-wetting to the liquid. Thus, the central tube 53 may be formed of glass with its interior walls along the bore 55 coated with a material that is non-wetting by the liquid 31. For example, if the liquid is an aqueous solution of dye and ethylene glycol, the walls may be coated with a silicone or the like if the tube 53 is formed of glass. Of course, if the tube 53 is formed with a hydrophobic material such as polyethylene, it will not be wet by the aqueous liquid 31. In the illustrated embodiment, a porous permeable solid 57 is retained in place in each end of the tube 25. The porous, permeable solid 57 may comprise frittered glass, alumina or the like that is readily wet by even a small droplet of the aqueous solution of the dye. Thus, even a small droplet will effect a readily visible coloring of the solid to warn the observer that the predetermined shock has been experienced. As usual, the ends 45 sealingly enclose the ends of the tube 25, as by epoxy bonding.

In operation, the tubes of FIG. 4A or 5 are made up as described and inserted within the case 41, or on suitable mounting base. The combination is then firmly affixed, such as described hereinbefore, to the instrument or case that is to be monitored for receiving the shock. If the interfacial barrier between the two materials 29 and the 31 is disrupted, a visible indication is given to the observer that the predetermined shock has been received. He should take appropriate action.

To understand and insure obtaining reproducible data such that the device 13 always registers if a predetermined shock has been experienced, it may be well to review some of the theoretical considerations. It should be emphasized, however, that this invention works and that the desired results are obtained, as described hereinbefore; do not depend on the consequences, direct or indirect, of any of the theoretical explanation offered hereinafter; and it is to be remembered that the theoretical explanation is given only as a theory to try to enhance the reader's understanding.

THEORETICAL CONSIDERATIONS

A relationship giving the minimum acceleration, or shock, necessary to activate the device 13 as a function of the mass of the liquid, the contact angle between the liquid and the capillary wall, the radius of the capillary, the surface tension of the liquid and the density of the liquid is suggested as follows. Since when the device 13 is subjected to a sufficiently great acceleration, or mechanical shock, a droplet of liquid is detached from the main body of liquid, it would seem that the equation for measurement of the surface tension by the drop weight method might be applicable. The equation is:

$$W = 2\pi r \gamma f \quad (II)$$

where:
W is the weight of a drop of liquid,
r is the radius of the capillary in commensurate units,
$\gamma$ is the surface tension of the liquid,
f=(r/a) where a is the capillary constant, $a^2 = rh$ where h is the height the liquid rises in a capillary of radius r. (r/a) has been measured for a series of r/a by Harkins and Brown and is publicly available in tabular form.

The notation A is the acceleration (g) in the case of the drop weight method, and m' is the mass of the drop.

$$W = m'A \quad (III)$$

$$A = (2\pi r \gamma f)/m' \quad (IV)$$

$$G = A/g = 2\pi r \gamma f/(gm) \quad (V)$$

where:
g is the acceleration of gravity, and has the value 980 centimeter per second per second (cm/sec$^2$)

The droplet may either be a spherical droplet or a column of the liquid 59, FIG. 6. If spherical, the equation for the mass is:

$$m = (4/3)\pi r^3 \rho \quad (VI)$$

where:
$\rho$ is the density of the liquid.
If the column is employed, the mass is expressed by equation VII.

$$m' = \pi r^2 l \rho \quad (VII)$$

Thus solving, the equation should logically have the form:

$$G = A/g = 2\pi r \gamma f C/(g r^n l \rho) \quad (VIII)$$

where:
n is an unknown exponent,
l is the length of the liquid in the capillary in commensurate units,
C is an unknown constant.

Since both n and C are unknown, the relationship between the diameter and the fluid may be effected by empirical data based on a given liquid 59, FIG. 6, in a given bore diameter. Expressed otherwise, Equation VIII can be written in the form:

$$\text{Log } G = \text{Log } C_1 - (n-1)\text{Log } r \qquad (IX)$$

where:
$$C_1 = 2\pi r \gamma f C/(g l \rho)$$

From this, the empirical solution can be arrived at, shown by FIG. 3B, for a given set of materials 29 and 31 in a given tube 25. With the given system, as noted hereinbefore; Equation X describes the correlation. Note Equation X is the same as Equation I.

$$G = 3.28/(r^{1.11}) \qquad (X)$$

Since the mass of the liquid thread in the capillary in FIG. 6 appears as a function of the radius (r), length (l), and the density ($\rho$), equation XI expresses a probable relationship.

$$G = C_2/(l\rho r^{1.11}) \qquad (XI)$$

$C_2$ is an unknown constant.

Equation XI can be verified by empirical data by plotting the Log G against Log L, the other variables being held constant.

It is difficult to take the analogy to an ultimate conclusion, since apparently the operation of the device depends upon the separation of the liquid from the wall of the capillary similar to Equation XII.

$$\gamma GS - \gamma LS = \gamma LG^{\cos\theta} \qquad (XII)$$

where:
$\gamma GS$ is the solid-gas "interfacial tension",
$\gamma LS$ is the solid-liquid "interfacial tension",
$\gamma LG$ is the surface tension of the liquid, and $\theta$ is the contact angle. Moreover, the compressible fluid below the liquid in the capillary in a sealed tube undergoes compression. Since the compression appears in a small fraction of a second, it must be adiabatic and so is calculable. Table I indicates such a calculation.

Table I*

Pressure Change for an Adiabatic Compression of an Ideal Gas

| Distance liquid moves down tube | New Volume | Pressure Atmos. | Pressure Atmos. | G |
|---|---|---|---|---|
| 0.0 | V | 1. | 0 | 0 |
| 0.1L | .9V | 1.19 | 0.19 | 3.51 |
| 0.2L | .8V | 1.45 | 0.45 | 8.41 |
| 0.5L | .5V | 3.18 | 2.18 | 40.90 |

*These calculations apply to an ideal monatomic gas and are only intended to give a rough idea of magnitude.

where:
L = length of the free bore
V = original volume
$C_P$ and $C_V$ = thermodynamic properties of gas
$\text{Log}(P_1/P_2) = (C_P/C_V)\text{Log}(V_2/V_1)$
$\text{Log } P_2 = -1.67 \text{Log}(V_2/V_1)$ Still another approach employing the capillary similar to the device of FIG. 6 is a theoretical tube cross section per FIG. 7. Consider a closed curved interface of radius R makes a contact angle $\theta$. The relationship are as follows:

$P_1$ is the pressure inside the liquid,
$P_2$ is the pressure outside the liquid.

$$\Delta P = P_1 - P_2 = 2\gamma/R$$

where:
$\gamma$ is the surface tension

R is the principal radius of curvature, and
r is the radius of the capillary, all in commensurate units.

By elementary geometry $R = r/\cos \theta$, and the equation becomes that of Equation XIII.

$$\Delta P = 2\gamma/(r \cos \theta) \qquad (XIII)$$

As the slug of liquid moves down the capillary and out of the end, the radius of curvature in that portion entering the capillary changes from $R = r/\cos \theta$ to $R = r$ and the pressure necessary to move the liquid out of the capillary will be defined by Equation XIV.

$$P = 2\gamma(1 + \cos \theta)/r \qquad (XIV)$$

Once the liquid attains a radius r at the end of the tube, all of it will run out of the end. The force on the liquid in the capillary produced by the acceleration, A, is defined by Equation XV.

$$mA = \pi r^2 l \rho A \qquad (XV)$$

The force will be applied over the cross sectional area of the capillary, hence the force per unit area is defined by Equation XVI.

$$mA/(\pi r^2) = \pi r^2 l \rho A/(\pi r^2) = \rho l A \qquad (XVI)$$

$$A = 2\gamma(1 + \cos \theta)/(r l \rho) \qquad (XVII)$$

$$G = 2\gamma(1 + \cos \theta)/(r l g \gamma) \qquad (XVIII)$$

The effect of changing $\theta$ is shown in Table II and the effect of r is shown in Table III.

Table II

Effect of Change in $\theta$ on G

| $\theta$ | $(1 + \cos \theta)$ | G – Force $G = \gamma(1 + \cos\theta)/grl\rho$ | |
|---|---|---|---|
| 90° | 1 | 5.39 | where: |
| 100° | 0.826 | 4.46 | $\gamma$ is 70 dyne/cm |
| 110° | 0.658 | 3.54 | g is 980 dynes |
| 120° | 0.500 | 2.70 | r is .053 cm. |
| 130° | 0.357 | 1.93 | l is 0.5 cm |
| | | | $\rho$ is 1 gram/cm³ |

Table III

Effect of r on G

| r cm. | G | |
|---|---|---|
| .05 | 4.72 | where: $\gamma$ is 70 dyne/cm |
| .04 | 5.90 | g is 980 dynes |
| .03 | 7.87 | $\theta$ is .10 degrees |
| .02 | 11.87 | l is 0.5 cm |
| .01 | 23.6 | $\rho$ is 1 |

Another device that is useful is illustrated in FIG. 8. Here, the glass tubes 25A and 25B intersect near their midpoints to define the intersection 63. The bores are sealed by suitable ends 45. Connected with the ends 45 and cantilevered into the interior of the bore of the tubes 25A and 25B are plugs 65. The plugs 65 are porous and permeable with a predetermined pore size in the nature of microfilters, and are non-wettable by the liquid droplet 31 in the intersection 63. For example, if the liquid droplet 31 is an aqueous solution, the plugs 65 may be formed of a non-wetting material such as Teflon having the predetermined pore size and distribution therewithin. On the other hand, the plug 65 may be ormed of glass that has previously had its pore surfaces wet by a material that is non-wettable by the aqueous liquid in droplet 31. The converse rationale is employed if the liquid droplet 31 is a hydrophobic liquid; that is, the surfaces of the micro-pores are rendered non-wetting, either by the selection of the material, or by another liquid that is applied to the surface. This device is directional along the x and y axes in a given plane and is preferable for this reason. In addition, the accurate characterization of the micro-pores in the plugs 65 afford a good means of calibrating a given device for use with respect to other devices.

A more sophisticated device 13 is illustrated in FIG. 9. Therein, a transparent cube 67 is employed to define the respective bores 27A, 27B, and 27C oriented at mutually perpendicular axes, analogous to the x, y and z axes. As illustrated, the respective bores define an intersection 69 near their respective midpoints. A drop of liquid 31 is isolated in the intersection 69 with pockets of air, or other material 29, in the respective ends of the bores. The cube 67 has an adhesive backing 49, as described hereinbefore, for being connected with a carrying case or instrument to be monitored for shock. The device of FIG. 9 is advantageous in that it affords directional sensitivity along any of the three axes. As illustrated, the ends of the respective bores are sealingly plugged with ends that are adhered in position.

One advantage of this invention is that the simple single bore devices such as illustrated in FIG. 3A can be made omnidirectional by proper proportioning of the materials in the tube 25.

The factors that affect performance in a vertical drop are:
(1) diameter of the tube,
(2) interfacial tension between the materials,
(3) density of the liquid,
(4) surface tension of the liquid,
(5) free air space in the tube, and
(6) volume of the liquid.

The factors that affect performance in a horizontal drop, or transverse acceleration, are:
(1) diameter of the tube,
(2) interfacial tension between the materials,
(3) density of the liquid, and
(4) surface tension of the liquid.

From the foregoing it can be seen that the free air space and the volume of the liquid do not affect the transverse acceleration, such as that experienced in dropping a horizontal tube (referred to herein as a horizontal drop). This allows a method of forming an omnidirectional detection device 13. The following steps are involved. Firstly, the G factor is obtained for a horizontal drop for a given liquid, tube, and bore diameter system. This can be done as outlined hereinbefore by empirically plotting data on a given liquid-gas system in a given type tube with different diameters. Thereafter, the length of the tube is varied as is the length of the free air space and the volume of the liquid within the tube through a variety of trials.

Secondly, the length of the liquid droplet blocking the bore of the tube is varied until the volume of the liquid gives substantially the same number of G's to rupture the interfacial barrier in a vertical drop as that experienced in the horizontal drop. By vertical drop is meant the dropping of tube with it held vertically so that the acceleration force is along the longitudinal axis of the tube. Drops at other angles, such as 45°, do not effect rupture at significantly different accelerations when the horizontal and vertical drops are balanced.

Ordinarily, the following criteria have been found helpful. The length of the liquid droplet need be no greater than about 5d, where d is the diameter of the bore. The length of the liquid droplet must be no less than 1d. Ordinarily, the smaller the diameter of the bore the greater the number of the G's that will be required to affect a rupture of a given interfacial barrier. Moreover, it has been found that the length of the column of liquids if roughly proportional to the diameter of the bore. From this it follows that use of smaller diameter tubing to attain that will withstand greater shock, or acceleration, allows use of shorter ribs and shorter respective slugs of material therewithin.

Table IV illustrates some examples of devices of various diameters to determine directional sensitivity. The devices yielding the data in Table IV were all made with tubes having columns of liquids that were 0.2 inch (in.) in length, all the tubes being 1 inch long so that the remainder was filled with gas, the gas being air. The water-glycol-dye solutions described hereinbefore were employed as the liquid. As can be seen, the diameter affects the horizontal drop to a greater extent than in the vertical drop.

TABLE IV

| Diameter (in.) | Vertical Drop (in.) | Horizontal Drop (in.) |
|---|---|---|
| .106 | 3.25 | 2.25 |
| .085 | 4.00 | 3.25 |
| .066 | 7.0 | 5.5 |
| .053 | 8.0 | 8.25 |
| .042 | 10.25 | 12.5 |

Table V demonstrates that the exemplified devices are not significantly affected on their horizontal drop by altering the length of the liquid droplet, B, FIG. 3A. Conversely, the vertical droplet is significantly affected, the longer droplets being unable to withstand as high an impact. The distance, C, to the droplet is useful in knowing where to put an insert to pick up and make more nearly visible the droplet.

In Table V, the same aqueous solution of glycol and dye was employed as described hereinbefore. The internal length of the bore was 1 inch.

In carrying out the tests as delineated hereinbefore, a final design has been arrived at for the best tube such as illustrated in FIG. 4A with the inserts 39 within glass tubing and the aqueous solution of glycol and dye as the liquid. The tubing had a bore of 0.047 inch. The inserts 39 were 0.125 inch long and inserted into the bore with less than one thousandths inch clearance so they were held in place by friction. They were placed 0.07 inch from the end of the droplet of liquid. The droplet of liquid was formed to be 0.11 inch in length. This allowed obtaining the same rupture point in terms of the acceleration force for both vertical and horiztonal, or longitudinal and transverse, accelerations.

TABLE V

| Vertical Drop | | | Horizontal Drop | | |
|---|---|---|---|---|---|
| B | C | Impact | B | C | Impact |
| .1 | .250 | 6.0 | .1 | .120 | 6.0 |
| " | .180 | 6.0 | " | .125 | 6.0 |
| " | .200 | 6.0 | " | .130 | 6.0 |
| .2 | .150 | 4.0 | .2 | .120 | 5.0 |

TABLE V-continued

| Vertical Drop | | | Horizontal Drop | | |
|---|---|---|---|---|---|
| B | C | Impact | B | C | Impact |
| " | .090 | 3.0 | " | .130 | 6.0 |
| " | .100 | 3.0 | " | .125 | 6.0 |
| " | .100 | 3.0 | " | .130 | 6.0 |
| .3 | .100 | 3.0 | .3 | .115 | 5.00 |
| " | .100 | 3.0 | " | .120 | 6.0 |
| " | .080 | 2.5 | " | .115 | 6.0 |

Illustrated in FIG. 10 is another device in which the liquid 31 is trapped intermediate non-wetting porous, permeable plugs 73 in the bore of the tube 25. Upon receiving a predetermined large shock the liquid is forced through the plugs. If desired, the plugs may be frangible so as to perform analogously to a mechanical embodiment.

OTHER EMBODIMENTS

In FIGS. 11 and 12, there is illustrated a mechanical embodiment of the device 13 which affords a "go-no go" condition. Specifically, in FIG. 11, a weight 75 is attached via a hard drying adhesive, or some other suitable means, via a predetermined neck 77 to the concave side 79 of a transparent dome 81. The pedestal 83 is molded as an integral part of the dome and provides a precise contact area for the weight attachment. The weight 75 will break the bond and become loose in the container when the forces on the weight exceed the strength of the bond, as by a certain shock, or acceleration. The transparent dome may have dual sided tape, or adhesive backing 85, for being affixed directly to the skin 87 of a case of the like. If desired, of course, the transparent dome may be affixed to a suitable mounting base and the base attached to the skin 87, or the instrument being monitored.

In operation, the shock detecting device 13 is assembled as described hereinbefore and affixed, by being adhered, to the skin 87. The container, or case, is then carried around as usual. In the event that the predetermined shock is effected, the weight 75 is broken loose and will be visible to the observer in a position other than the center; for example, on one side as shown by the dashed lines 89. This warns the observer that the predetermined shock has been received and that the device or instrument in the case should be recalibrated, or carefully checked, before being used.

Still another mechanical embodiment of the invention is illustrated in FIGS. 13-15. Therein, the shock detection device 13 includes the mounting base 23, as described hereinbefore, the measuring means 19, and the indicator means 21, FIG. 15. Specifically, the measuring means comprises a coil spring 91 that is affixed rigidly at its end to the case 93, as by brads and bracket 95. The coil spring 91 supports a weight 97. As indicated, the weight 97 has a marking stylus 99 that impinges upon a record 101 so as to make a track of the traverse, or trajectory, of the weight 97. The stylus 99 may comprise a rounded stylus, such as rounded sapphire, a corundum stylus, a diamond stylus, or the like; or it may comprise a suitable marking device, such as a ballpoint pen or the like. The latter approach has reduced friction in contact with the record 101.

If desired, the record may be emplaced atop the weight, as indicated by the dashed lines 103 for even further reduced friction.

As illustrated in FIG. 15, the record 101 has orientation index 105 such that the direction from which the shock was experienced can be measured, for example as illustrated by the peak 107 at about 85° from the index 105. The record 101 has a plurality of rings indicating in terms of tens of G's, or ten times the force of gravity. The rings are calibrated for the characteristics of the spring. Of course, any other desired marking can be employed.

In any event, the shock detection device 13 is physically connected with the case to be monitored. After the arrival at the destination, the observer may look at the record. One of the advantages of employing the record on the top (with suitable marking) is that it is more clearly visible without having to look through the spring or the like. If desired, records may be placed on both top and bottom so as to afford a cross check. One of the advantages of the device of FIGS. 13-15 is that the record affords a history of all the shocks received by the case rather than affording simply a "go-no go" indication.

The components of the device 13 of FIGS. 13-15 are those usually employed in similar art. Specifically, the spring 91 ordinarily will be formed of steel. The case may be formed of any suitable material; such as, light weight plastic delineated hereinbefore or light weight materials like aluminum or magnesium. The record may comprise changeable sheets, as of paper, plastics or the like. Obviously, the stylus and the record will be compatible so as to form a mark when the record is traversed by the stylus.

From the foregoing, it is apparent that this invention has provided an economical shock detection device that obviates the problems of the prior art and solves a current need. Many variations and different embodiments of the invention may be employed.

Moreover, although the invention has been described with a certain degree of particularity, it is understood that the present disclosure is made only by way of example and that numerous changes in the details of construction and the combination and arrangement of parts may be resorted to without departing from the spirit and scope of this invention, the latter being determined by the appended claims.

What is claimed is:

1. A method of forming a shock detection device for detecting and notifying an observer that a predetermined acceleration has been received by an article being monitored comprising the steps of:
   A. forming a measuring means for measuring if said predetermined acceleration has been received by constraining a liquid into the form of a deformable reservoir that will deform responsive to acceleration and return to its original shape when the acceleration ceases if the acceleration is below the predetermined acceleration; containing a gas adjacent said deformable reservoir of liquid and in contact with at least one side thereof so as to define an interfacial barrier therebetween having a predetermined interfacial tension, the size of the liquid reservoir and the interfacial tension being chosen such that said predetermined acceleration effects rupture of said interfacial barrier such that at least a droplet of said liquid breaks away from said liquid reservoir; sealingly containing said reservoir of liquid and said gas within a structure;
   B. forming an indicator means and connecting said indicator means with said measuring means for indicating that said predetermined acceleration has been effected; said indicator means being formed by providing a visual means disposed adjacent said interfacial barrier for indicating when said interfacial barrier has been ruptured and C. connecting said measuring means and said indicator means with an attachment means for attaching said device to the article for monitoring if said predetermined acceleration has been received.

2. The method of claim 1 wherein the shock detection device is substantially omnidirectional to register the shock from any direction and steps A and B of claim 19 comprise the steps of:

A. forming a tube having a bore of predetermined diameter;

B. forming a liquid and suspending a droplet of said liquid in said bore with said droplet completely blocking said bore such that an interfacial barrier is formed on both ends of said droplets and a slug of gas is trapped at said ends of said bore when said bore is sealed, said predetermined diameter and said liquid being chosen with respect to a given tube so as to obtain rupture of said interfacial barrier when subjected to a transverse shock of a predetermined magnitude sufficient to cause a potential malfunction in said article being monitored;

C. experimentally varying the length of said liquid droplet and the respective slugs of air sealed in said tube until the longitudinal shock of substantially the same magnitude as said transverse shock effects the rupture of said interfacial barrier such that said barrier is ruptured at the predetermined acceleration, regardless of the direction from which the acceleration is experienced;

D. sealing the tubes having the predetermined length of the liquid droplet to effect the omnidirectional properties with respective slug of gas also trapped in the bore with the liquid; and E. connecting the resulting sealed tube with the gas and liquid therewithin to the attachment means for connection with the article to be monitored such that said gas space is visible to an observer to detect if a droplet of liquid has been separated to indicate that said barrier has been ruptured.

3. The method of claim 1 wherein said measuring means is formed by forming a bore of predetermined diameter and forming a droplet of liquid in said bore and forming a slug of gas on at least one end of said bore and adjacent at least one side of said droplet of liquid so as to define said interfacial barrier therebetween; said liquid being chosen with respect to said bore so as to obtain rupture of said interfacial barrier once subjected to a shock of a predetermined magnitude sufficient to cause a potential malfunction in said article being monitored; sealing the bore having the predetermined liquid reservoir droplet and gas slug therewithin; and connecting the resulting sealed bore with the gas and liquid therewithin to the article to be monitored such that said gas space is visible to an observer to afford said indicator means to detect if a droplet of liquid has been separated to indicate that said barrier has been ruptured.

* * * * *